US009158589B2

(12) United States Patent
Stewart et al.

(10) Patent No.: US 9,158,589 B2
(45) Date of Patent: Oct. 13, 2015

(54) METHOD FOR DYNAMIC MIGRATION OF A PROCESS OR SERVICES FROM ONE CONTROL PLANE PROCESSOR TO ANOTHER

(75) Inventors: Randall Stewart, Chapin, SC (US); Renwei Li, Fremont, CA (US); Xuesong Dong, Pleasonton, CA (US); Hongtao Yin, Fremont, CA (US); Huaimo Chen, Bolton, MA (US); Bisong Tao, San Jose, CA (US); Yang Yu, San Ramon, CA (US); Weiqian Dai, San Jose, CA (US); Ming Li, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 444 days.

(21) Appl. No.: 13/080,194

(22) Filed: Apr. 5, 2011
(Under 37 CFR 1.47)

(65) Prior Publication Data
US 2012/0209989 A1 Aug. 16, 2012

Related U.S. Application Data

(60) Provisional application No. 61/321,066, filed on Apr. 5, 2010, provisional application No. 61/324,610, filed on Apr. 15, 2010.

(51) Int. Cl.
*G06F 15/173* (2006.01)
*G06F 9/50* (2006.01)
*H04L 12/773* (2013.01)

(52) U.S. Cl.
CPC .............. *G06F 9/5061* (2013.01); *H04L 45/60* (2013.01)

(58) Field of Classification Search
CPC ...................................................... H04L 45/60
USPC .......................................... 209/201; 709/224
See application file for complete search history.

(56) References Cited

U.S. PATENT DOCUMENTS 5,774,660 A * 6/1998 Brendel et al. ................ 709/201
5,787,250 A 7/1998 Badovinatz et al.
(Continued)

FOREIGN PATENT DOCUMENTS

WO 0182678 A2 11/2001

OTHER PUBLICATIONS

Stewart, R., et al., "Internal Router Capability Protocol (IRCP)," draft-stewart-xxxx-ircp-00.txt, Jan. 21, 2011, pp. 1-28.
(Continued)

*Primary Examiner* — David X Yi
(74) *Attorney, Agent, or Firm* — Conley Rose, P.C.; Grant Rodolph; Brandt D. Howell

(57) ABSTRACT

An apparatus comprising a processor configured to migrate load from a source process running on the processor to a target process running on a peer processor in a dynamic manner by monitoring an amount of resources used by the source process, wherein the load is migrated when the amount of resources utilized by the source process exceeds a threshold. Also disclosed is a network component comprising a first processor configured to select a source process to migrate a load from the first processor based on available resources on the first processor and the source process; and a second processor configured upon receiving a migration request from the first processor to one of select and start a target process to which to migrate the load based on available resources for the second processor and the target process.

18 Claims, 10 Drawing Sheets

(56) References Cited

U.S. PATENT DOCUMENTS

| | | | |
|---|---|---|---|
| 7,039,694 B2* | 5/2006 | Kampe et al. | 709/222 |
| 7,136,924 B2 | 11/2006 | Dauger | |
| 7,203,944 B1 | 4/2007 | van Rietschote et al. | |
| 7,421,578 B1 | 9/2008 | Huang et al. | |
| 2004/0064568 A1 | 4/2004 | Arora et al. | |
| 2004/0073933 A1* | 4/2004 | Gollnick et al. | 725/81 |
| 2005/0267943 A1 | 12/2005 | Castaldi et al. | |
| 2006/0056383 A1 | 3/2006 | Black et al. | |
| 2006/0155802 A1 | 7/2006 | He et al. | |
| 2007/0244962 A1* | 10/2007 | Laadan et al. | 709/201 |
| 2008/0046890 A1 | 2/2008 | Dunlap et al. | |
| 2008/0104608 A1* | 5/2008 | Hyser et al. | 718/105 |
| 2008/0209067 A1* | 8/2008 | John et al. | 709/231 |
| 2008/0270610 A1 | 10/2008 | John et al. | |
| 2009/0063665 A1* | 3/2009 | Bagepalli et al. | 709/222 |
| 2009/0063686 A1* | 3/2009 | Schmidt et al. | 709/227 |
| 2012/0136944 A1 | 5/2012 | Stewart et al. | |
| 2012/0137012 A1 | 5/2012 | Stewart et al. | |
| 2013/0064088 A1 | 3/2013 | Yu et al. | |

OTHER PUBLICATIONS

Bradner, S., "Key Words for Use in RFC's to Inicate Requirement Levels," RFC 2119, Mar. 1997, pp. 1-3.
Ramakrishnan, K., et al., "A Proposal to Add Explicit Congestion Notification (ECN) to IP," RFC 2481, Jan. 1999, pp. 1-26.
Stewart, R., et al., "Stream Control Transmission Protocol," RFC 2960, Oct. 2000, pp. 1-126.
Ramakrishnan, K., et al., "The Addition of Explicit Congestion Notification (ECN) to IP," RFC 3168, Sep. 2001, pp. 1-64.
Stewart, R., "Stream Control Transmission Protocol," RFC 4960, Sep. 2007, pp. 1-153.
Rodrigues, L., et al., "A Low Level Processor Group Membership Protocol for LANS," Technical University of Lisboa, 1993, pp. 541-550.
Foreign Communication From a Related Counterpart Application, International Search Report , PCT/US2011/031252, Aug. 22, 2011, pp. 1-5.
Foreign Communication From a Related Counterpart Application, Written Opinion, PCT/US2011/031252, Aug. 22, 2011, pp. 1-7.
Foreign Communication From a Related Counterpart Application, International Search Report, PCT/US2011/031258, Jul. 5, 2011, pp. 1-4.
Foreign Communication From a Related Counterpart Application, Written Opinion, PCT/US2011/031258, Jul. 5, 2011, 1-9 pages.
Foreign Communication From a Related Counterpart Application, International Search Report, PCT/US2011/031261, Jul. 4, 2011, pp. 1-4.
Foreign Communication From a Related Counterpart Application, Written Opinion, PCT/US2011/031261, Jul. 4, 2011, pp. 1-9.
Tahir, M., et al., "Cisco IOS XR Fundamentals," Cisco Press, 2009, 506 pages.
Tanenbaum, A., et al., "Distributed Systems Principles and Paradigms, Second Edition," Pearson/Prentice Hall, 2007, 704 pages.
Office Action dated Mar. 14, 2013; U.S. Appl. No. 13/080,172, filed Apr. 5, 2011, 31 pages.
Office Action dated Mar. 22, 2013; U.S. Appl. No. 13/080,248, filed Apr. 5, 2011, 31 pages.

* cited by examiner

METHOD FOR DYNAMIC MIGRATION OF A PROCESS OR SERVICES FROM ONE CONTROL PLANE PROCESSOR TO ANOTHER

CROSS-REFERENCE TO RELATED APPLICATIONS

The present application claims the benefit of U.S. Provisional Patent Application No. 61/321,066 filed Apr. 5, 2010 by Renwei Li, et al. and entitled "In-service Process Migration and Virtual Router Migration," and U.S. Provisional Patent Application No. 61/324,610 filed Apr. 15, 2010 by Renwei Li, et al. and entitled "In-service Process Migration and Virtual Router Migration," both of which are incorporated herein by reference as if reproduced in their entirety.

The present application is related to commonly assigned U.S. patent application Ser. No. 13/080,172 filed even date herewith by Randall Stewart, et al. and entitled "Method for Dynamic Discovery of Control Plane Resources and Services" and to commonly assigned U.S. patent application Ser. No. 13/080,248 filed even date herewith by Randall Stewart, et al. and entitled "Method for Dynamic On Demand Startup of a Process or Resource," both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Typical routing and switching platforms comprise about one or about two fixed control plane processors, e.g., route processors (RPs). Some routers or switches also comprise line processors (LPs). The control plane processors may run a plurality of processes and handle load in substantially a static or fixed manner, where processes require substantial manual configuration. In today's modern hardware, more control plane processors are being added to "scale up" a router or switch to handle more network traffic. For example, more than about three control plane processors may be used in network components by adding or plugging additional computation elements (CEs), such as LPs, e.g., with single or multiple core control plane processors. As the cost of CEs decreases, the quantity of control plane processors that can be used in the network components increases, and thus the control plane processors' capabilities to run more processes and services increases. To benefit from such increase in capability, a more dynamic configuration model may be needed, for example to allow automatic configuration of control plane processors, migration of processes between control plane processors, and distribution of load among control processors.

SUMMARY

In one embodiment, the disclosure includes an apparatus comprising a processor configured to migrate load from a source process running on the processor to a target process running on a peer processor in a dynamic manner by monitoring an amount of resources used by the source process, wherein the load is migrated when the amount of resources utilized by the source process exceeds a threshold.

In another embodiment, the disclosure includes a network component comprising a first processor configured to select a source process to migrate a load from the first processor based on available resources on the first processor and the source process; and a second processor configured upon receiving a migration request from the first processor to one of select and start a target process to which to migrate the load based on available resources for the second processor and the target process.

In a third aspect, the disclosure includes a method comprising selecting a first source process from a plurality of local processes for migrating a load from; sending a local request to the first source process; receiving a local response from the first source process; selecting a second source process if the local request is not accepted by the first source process; sending a migration request to a first target process; receiving a migration response from the first target process; selecting a second target process if the migration request is rejected by the first target process; and transferring the load from one of the first source process and the second source process to one of the first target process and the second target process.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Current architectures or models for configuring processors and processes on network components, e.g., routers or switches, may be static and may not support the migration of services or processes between different processors, also referred to herein as in-service process migration, dynamically without manual intervention. The term control plane processor and processor are used herein interchangeably. The term process and service may also be used herein interchangeably. Some systems may support manual process migration, which may disrupt some services and may not be suitable for on-line configuration. Disclosed herein is a system and method for supporting dynamic process migration between a plurality of processors on a network component without manual intervention. A plurality of services and/or processes that run on the processors may be migrated between the processors automatically, e.g., based on predefined policies and/or according to available resources or capacity on the processors. The process dynamic migration scheme may be performed on-demand without disrupting the processes and services running on the processors.

Figure 1:
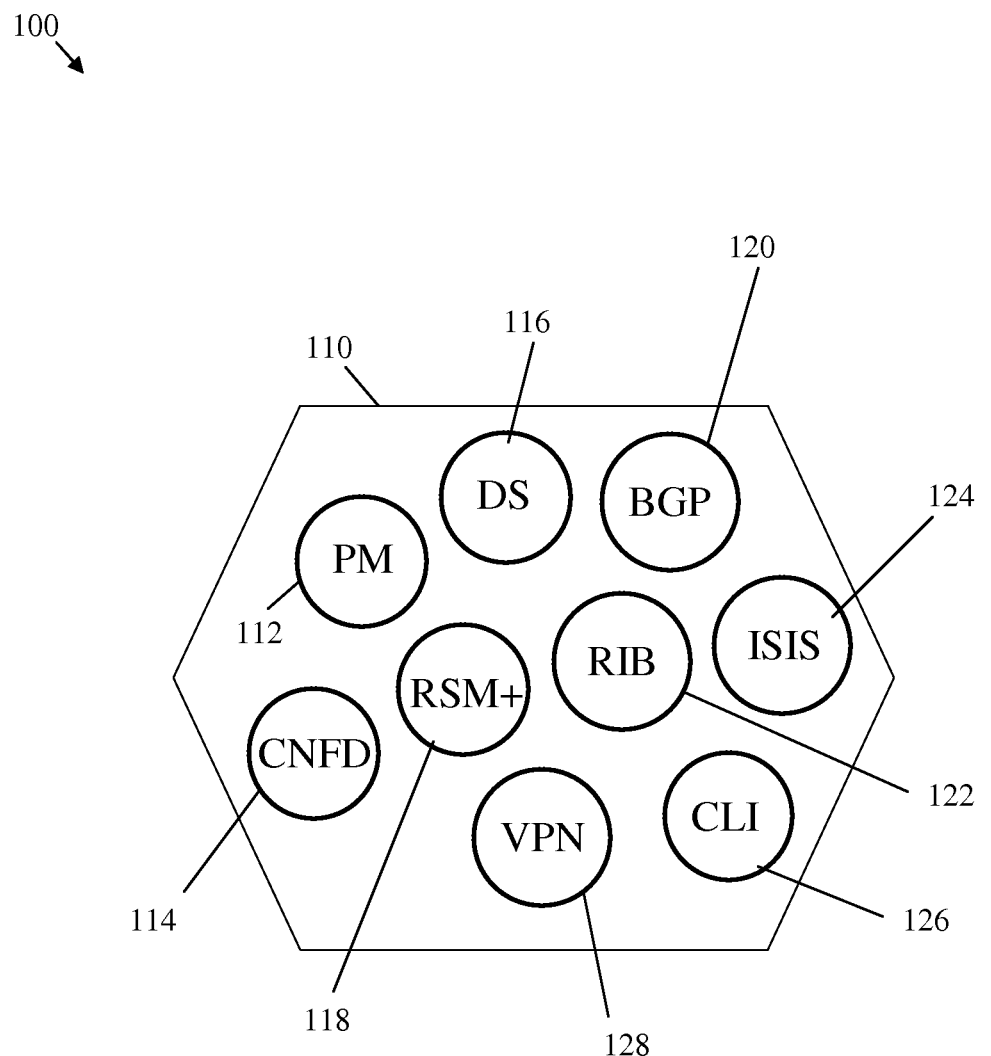
FIG. 1 is a schematic diagram of an embodiment of a plurality of associated processes.

FIG. 1 illustrates an embodiment of plurality of associated processes 100, which may run on a processor 110. The processor 110 may be a static control plane processor, e.g., a RP card, or a removable control plane processor, e.g., a LP card, which may be located in a network component, e.g. a switch or a router, a data server, or any other network component. The processor 110 may be any CE that is configured to implement or run one or more processes 100, which may handle services or functions related to the processor's operations. Specifically, the processes 100 may comprise a process manager (PM) 112 that is configured to start up and manage other processes and/or services on the processor 110. The processes 100 may also comprise other processes that may run on the processor 110 and provide a plurality of functions/services, such as for implementing a border gateway protocol (BGP) 120, a routing information base (RIB) 122, an Intermediate System to Intermediate System (IS-IS) protocol 124, a virtual private network (VPN) 128, a command-line interface (CLI) 126, a Directory Service (DS) 116, a Configure Daemon (CNFD) 114, a Resource Manger (RSM+) 118, or combinations thereof.

The PM 112 may be configured to manage initial system startup of other processes and to monitor the other processes 114, 116, 118, 120, 122, 124, 126, 128 that run on the processor 110. The PM 112 may monitor the other running processes to verify that the processes are running appropriately and not failing, e.g., due to lack of resources. The PM 112 may also restart any failed process or kill any process, such as a run-away process, e.g., to save resources. Additionally, the PM 112 may be configured to communicate with other processes, e.g., peer PMs, that run on peer processors (not shown) using an Internal Router Capability Protocol (IRCP). IRCP allows existing software to automatically find new hardware elements and discover their capabilities. Furthermore IRCP allows older entities to migrate load to new entities thereby automatically using the new processing capacity which simplifies both deployment and administration while providing a high degree of scalability and availability. The peer processors may be similar to the processor 110 and may be located on the same network component of the processor 110, e.g., on the same switch or router.

The IRCP may be configured to allow the dynamic configuration of processes, including PMs, on one or more processors in a network component, e.g., for routing and/or switching operations. The IRCP may allow a network administrator to add a new CE or multiple CEs to a network component, e.g., to expand routing and switching capabilities.

The IRCP may allow the software existing on the network component to automatically find new hardware elements and discover their capabilities. Further, the IRCP may allow CEs to migrate load of processes to other CEs, in a dynamic or automatic manner without manual configuration, e.g., to make use of new processing capacity due to adding new CEs. As such, the IRCP may simplify network deployment and/or administration while providing an improved degree of scalability and availability, e.g., in comparison to current static configuration schemes.

Figure 2:
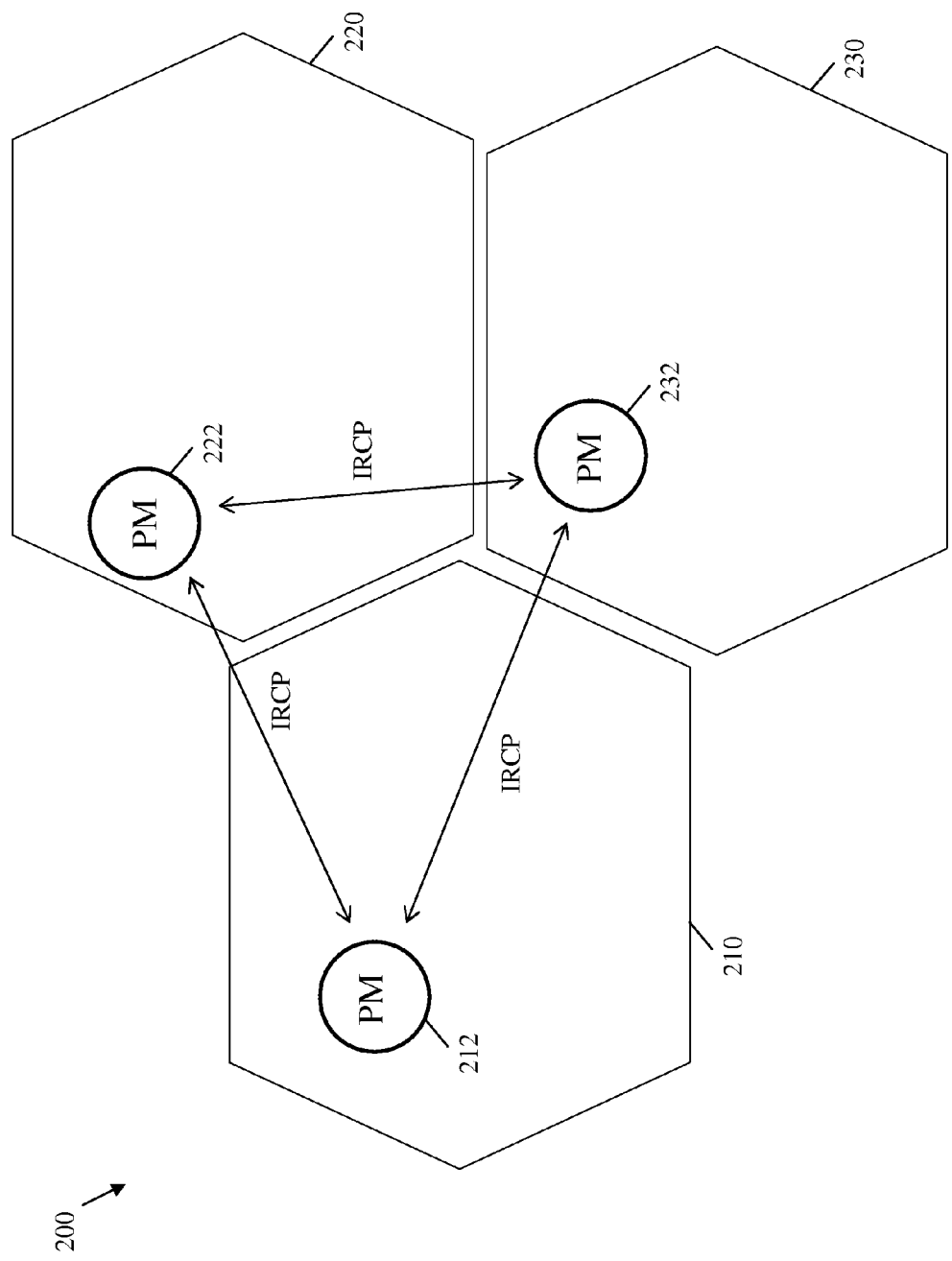
FIG. 2 is a schematic diagram of an embodiment of a plurality of associated control plane processors.

FIG. 2 illustrates an embodiment of a plurality of associated control plane processors 200, which may be located on a network component, such as a switch or a router. The processors 200 may comprise a first processor 210, a second processor 220, and a third processor 230, which may communicate with one another. The first processor 210, the second processor 220, and the third processor 230 may be CEs that include RP cards and/or LP cards. The processors 200 may comprise single core processors or CEs, multiple core processors or CEs, or both. The first processor 210, the second processor 220, and the third processor 230 may comprise a first PM 212, a second PM 222, and a third PM 232, respectively, which may run on the corresponding processors 200 and may be configured similar to the PM 112.

The processors 200 may use the IRCP to dynamically learn about one another, request start services from one another, migrate services or part of services between one another, and/or distribute load information between them. The IRCP may be implemented on a separate process in each of the processors 200 or as part of other services. In an embodiment, the IRCP may be implemented by the first PM 212, the second PM 222, and the third PM 232. The first PM 212, the second PM 222, and the third PM 232 may use the IRCP to dynamically discover one another, any processes of the processors 200, and their capabilities. The first PM 212, the second PM 222, and the third PM 232 may also use the IRCP to migrate processes/services between the processors 200 and change or balance load between the processors 200.

Figure 3:
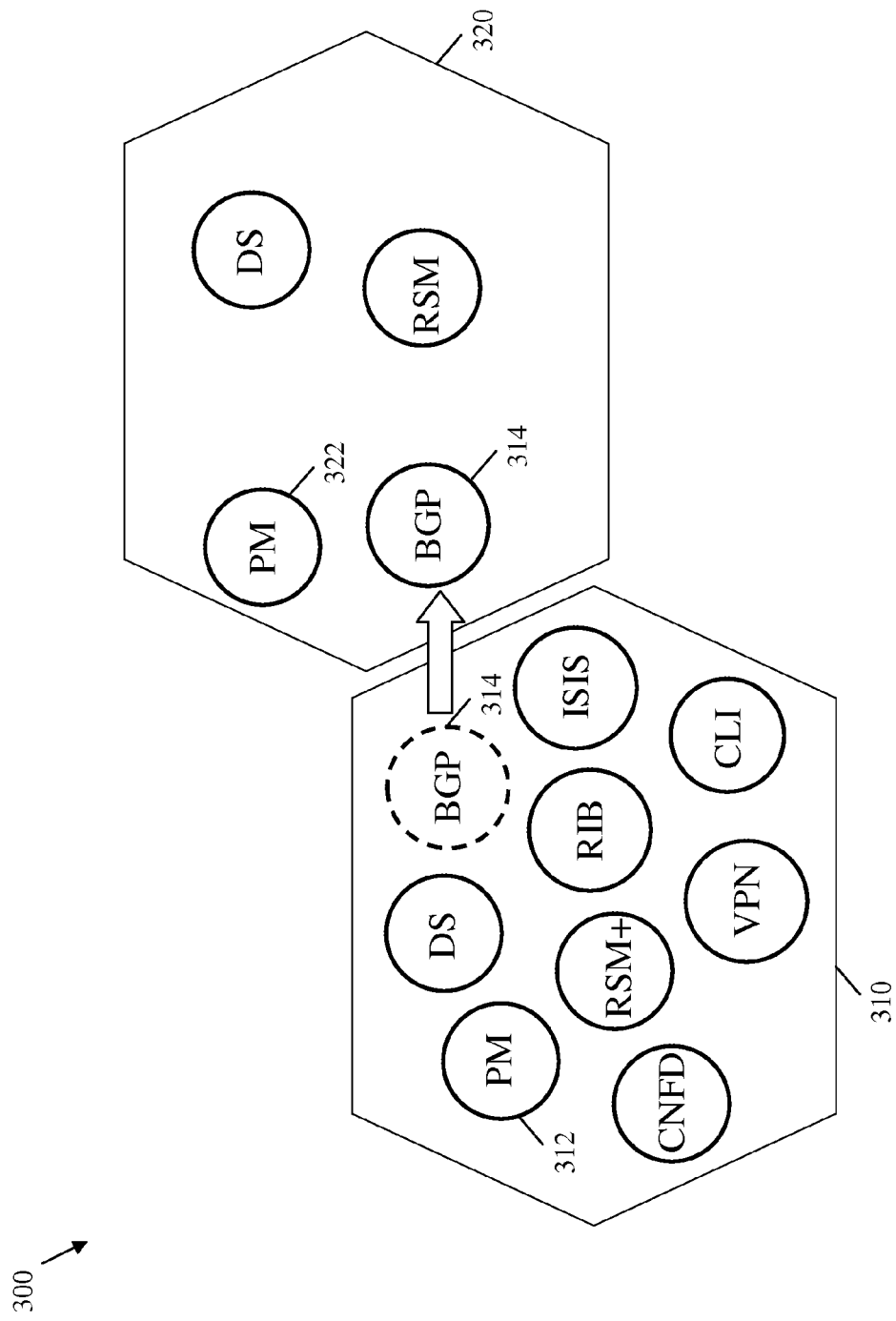
FIG. 3 is a schematic diagram of an embodiment of a process migration.

FIG. 3 illustrates an embodiment of a process migration 300 between a first processor 310 and a second processor 320, which may be configured similar to the processors 200. The first processor 310 and the second processor 320 may comprise a first PM 312 and a second PM 322, respectively, which may be configured similar to the PMs above and run on the corresponding processors. The first processor 310 and the second processor 320 may also comprise other running processes or services. For instance, initially, the first processor 310 may run processes for implementing BGP, RIB, IS-IS, VPN, DS, CLI, CNFD, and/or RSM+ functions or services. The second processor 320 may also run processes for implementing DS and RSM services.

The first PM 312 may monitor the running processes and the resources of the first processor 310. The first PM 312 or a separate process, e.g., an IRCP agent, may determine whether it is desirable to migrate a process on the first processor 310 to a peer processor, which is referred to herein as outbound migration. For instance, a process may be migrated to free some of the resources on the first processor 310 or prevent potential process failure. If it is desirable to migrate a process, the first PM 312 may determine which of the processes on the first processor 310 may be migrated. For instance, some processes may not be migrated during some critical operation periods. The first PM 312 may inquire an individual process to determine whether a process load, e.g., a task or operation, may be migrated. For example, the first PM 312 may select the busiest or most memory consuming process on the first processor 310. If the process accepts migrating of at least some of its load, the first PM 312 may select a suitable processor to transfer the load to. The first PM 312 may communicate with the second PM 322 in the second processor 320, e.g., using IRCP, to request migration to the second processor 320.

The first PM 312 may inquire the second PM 322 to verify if migration to the second processor 320 is possible or acceptable. Hence, the second PM 322 may examine a total load and resources of the second processor 320, a load of an individual process on the second processor 320 that is similar to the selected process on the first processor 310, and/or whether a process on the second processor 320 agrees to take on a new load from the selected process. In the case of a migration request for entire process load from the first processor 310, the second PM 322 may determine whether the second processor 320 may take on the entire process load based on the total load (of processes) and available resources on the second processor 320. Alternatively, in the case of a migration request for partial process load, the second PM 322 may determine whether a similar process on the second processor 320 may take on the partial load from the first process 310.

In one scenario upon receiving the migration request from the first PM 312, the second PM 322 may inform the first PM 310 that the process associated with the migration request, e.g., a BGP process, is not running on the second processor 320. Thus, the first PM 312 may send a request to the second PM 322, via IRCP, to start that process on the second processor 320. The second PM 322 may then start the requested process (e.g., BGP) on the second processor 320, which is referred to herein as inbound process, and inform the first PM 312 of the start of the inbound process. The first PM 312 may then inquire the second PM 322 if the inbound process on the second processor 320 may take a load from a similar outbound process (e.g., BGP) on the first processor 310. The second PM 322 may check if the inbound process accepts receiving a new load. If the inbound process accepts to receive a new load, the second PM 322 may examine internal statistics of processes running on the second processor 320 to determine whether the second processor 320 may receive additional external load.

If additional external load may be received on the second processor 320, the second PM 322 may inform the first PM 310 that the second processor 320 may take on new load from the first processor 310. The first PM 312 may then instruct the outbound process to migrate load to the inbound process. The load may be migrated to the inbound process via migration exchanges between the two corresponding processes, e.g., using an Interim Inter-Switch Signaling Protocol (ISSP). The outbound process may then inform the first PM 312 that load migration is completed and hence may be terminated.

In some embodiments, the processors that implement a process migration, such as the process migration 300, may support a virtual router function. The virtual router may run on a single network node or may involve a plurality of network nodes. Alternatively, the virtual router may be distributed across multiple physical nodes, where any physical node may also run other virtual routers. The virtual router function may be used when a new resource (e.g., processor) becomes available or an existing resource becomes unavailable. The processes on the processors may be associated with a set of one or more physical nodes, may be migrated independently to any node, or may be migrated only with some other processes, e.g., in a group of processes.

During the process migration, a process state synchronization may be implemented to ensure that in-service process migration, e.g., between different processors on the same router or switch, may be performed without service disruption. This may be achieved by starting the target process (inbound process) and allowing it to run in parallel, e.g., at an overlapping time period, with the source process (outbound process). While both processes are running, the process states may be locked and transferred from the source process to the target process, as described below. During this time, all service requests received from peer processors may be sent to both the source and target processes. Both the source and target processes may batch the received requests. After all process states are synchronized to the target process, the process states may be unlocked and the batched requests may be merged with the process states that may be completely transferred to the target process. The source process may then be terminated and the process migration may be completed. If an error occurs at any time during the migration, the migration may be rolled back or restarted.

Figure 4:
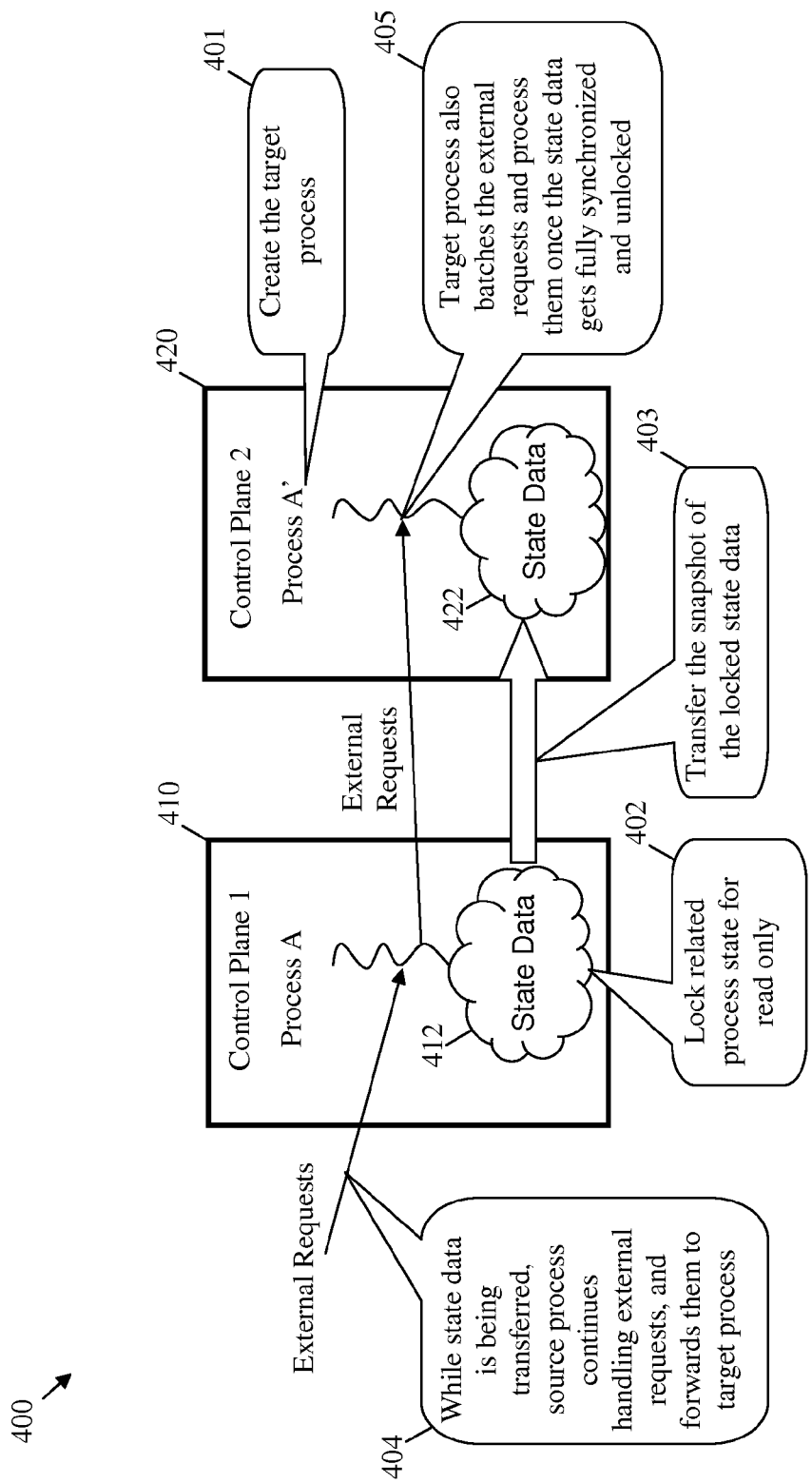
FIG. 4 is a schematic diagram of an embodiment of a process state synchronization.

FIG. 4 illustrates an embodiment of a process state synchronization 400 that may be implemented during process migrations, e.g., the process migration 300. The process state synchronization 400 may allow uninterrupted routing or switching by transferring related kernel states that correspond to the migrated process. During process migration, process state data may be transferred between a first control plane 410 and a second control plane 420, which may be two peer processors. At step 401, the second control plane 420 may create a target process A', for instance based on a request from the control plane 410 to transfer load for a similar source process A. At step 402, the first control plane 410 may lock related process state data 412 for read only status, which may prevent changes to the state data during migration. At step 403, the first control plane 410 may transfer a snapshot or copy of the locked state data 422 to the second control plane 420. At step 404, the source process A may continue handling any received external requests while state data is being transferred, and forward the external requests to the target process A'. At step 405, the target process A' may batch the received external requests and process the batched external requests when the state data are completely transferred, synchronized, and unlocked.

To accomplish process migration and state data synchronization, the source process A and its infrastructures (the first control plane 410) may retrieve from the infrastructure current information about the transport protocol and transfer this information to the target peer, e.g., process A'. The target peer may push this information into its local infrastructure (the second control plane 420) and instruct the infrastructure to hold packets that arrive until the target peer is ready. Both the target and source peers may need to update the internal routing to get the outside transport packets flowing to the target peer. The source peer may put its last updated transport state and send it to the target peer, which may update its local transport state and enable the reception of packets.

The process state synchronization 400 may be implemented to support a virtual router function. In an embodiment, a plurality of virtual routers may have a single set of tasks that perform routing functionalities. In another embodiment, each virtual router may have a corresponding set of tasks to perform each virtual router's functionalities. Virtual routers may be implemented in corresponding containers that isolate the virtual routers' states from other parts of the system to facilitate migration. To support uninterrupted or non-stop routing, the virtual router may be configured to continue seamlessly processing external messages during a process migration procedure. The virtual router migration may comprise the migration of a group of tasks' states or part of the states, and optionally other router specific states.

Figure 5:
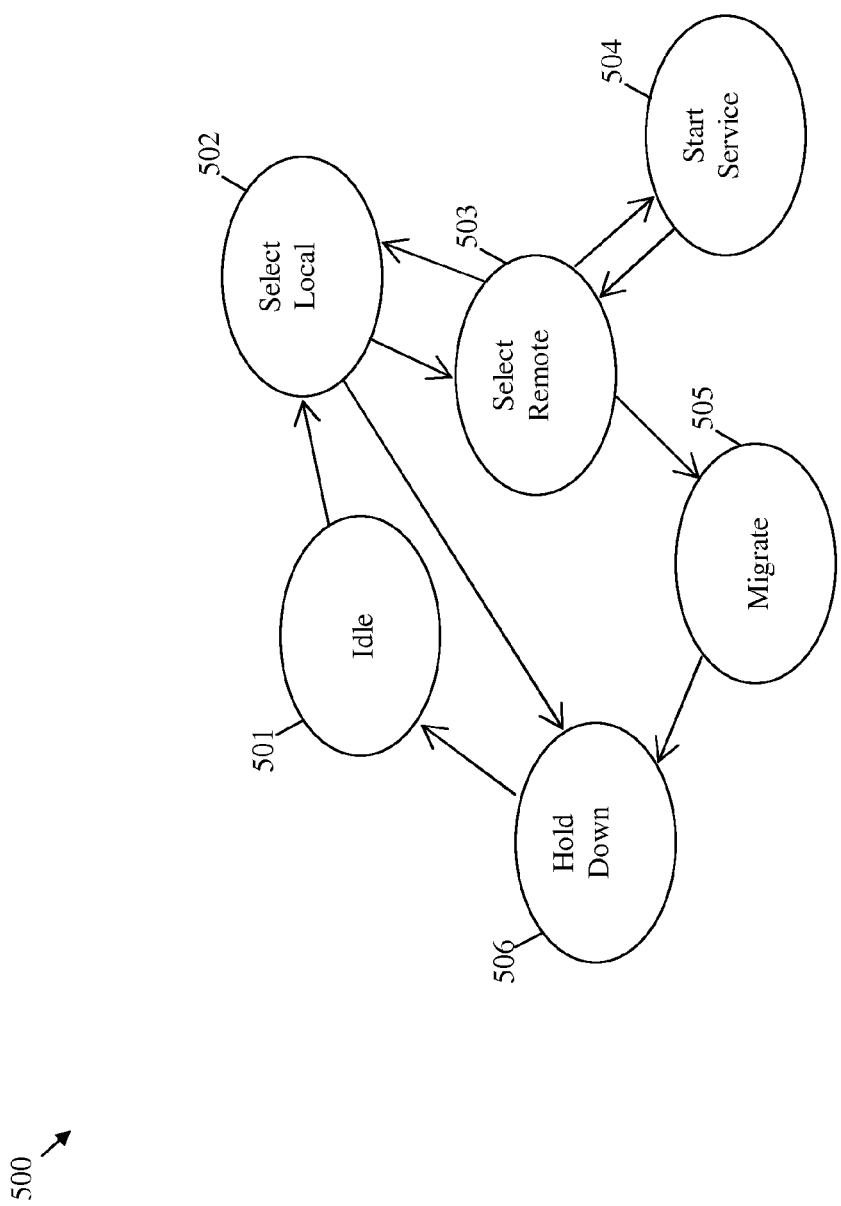
FIG. 5 is a schematic diagram of an embodiment of a process migration state machine.

FIG. 5 illustrates a migration state machine 500 that may be implemented during a process migration, such as the process migration 300. The migration state machine 500 may be triggered by an internal process, e.g., an IRCP agent, that monitors processes and resources on a processor and determines to migrate a process to a peer processor, for instance, when resources (e.g., central processing unit (CPU)/memory usage) reach a threshold. The migration state machine 500 may also be started by an external user command, e.g., using CLI. In some cases, only one migration state machine 500 may be implemented at a time, e.g., to ensure that load migration proceeds in relatively slow increments and a slow manner. Migrating too many processes at once or within relatively short time durations may cause bouncing load between processors as described below. The state machine 500 may have the capability to migrate the entire load of a process. In cases of upgrade/shutdown, the migration state machine 500 may be used under a user CLI direction at relatively slow load times but may not be used by automated facilities.

The migration state machine 500 may comprise an Idle state 501, a Select Local state 502, a Select Remote state 503, a Start Service (or Start Remote) state 504, a Migrate state 505, and a Hold Down state 506. The Idle state 501 may be entered upon creation of the migration state machine 500 and may not be exited without a request from the CLI or a request from an internal IRCP agent auditing of load. The migration state machine 500 may not respond to outside requests from any state but the Idle state 501. When the migration state machine 500 enters the Idle state 501, a plurality of processes and services may be marked as not having been visited for migration. This mark is used later in the Select Local state 502.

After leaving the Idle state 501, the migration state machine 500 may enter the Select Local state 502. The Select Local state 502 may involve selecting the local process to migrate. The Select Local state 502 may implement the following steps:

1—Upon entering the Select Local state 501, a plurality of peers (e.g., processors) may each be associated with two flags that may be marked in some fashion. Each peer may be monitored in turn, in some iterative order, and any peer that has advertised itself as being available and active may be marked (e.g., using a first flag) as not being yet considered for migration and marked (e.g., using a second flag) as not having been asked to start. If the peer is inactive or not available, then the peer may be marked as having been observed and requested to start. The flags may then be used in the following state (the Select Remote state 503).

2—Each process that has not been considered for a migration request based on its flag may be examined, and a process that has used the most resources (e.g., CPU/memory) and/or that has a shortage of resources may be selected. Each process may be monitored periodically for both CPU and memory usage. The Local Select state 502 may determine which process to select based on the last monitored period of the process.

3—If step (2) results in a process being selected, then a local request may be sent to the process to inquire if the process is willing to migrate load. The local request may be sent in an application specific message, which may be based on the local system. After sending the message, a response timer may be started and the process may be marked as being visited for a migration request.

4—The Local Select state 502 may wait for the response to the request message or a timeout. If a response arrives and confirms proceeding with migration, then the Local Select state 502 may go to step (6). If a timeout occurred or the response did not confirm migration, then the Local Select state 502 may go to step (1).

5—If step (2) results in a situation in which all visited processes are not willing to migrate, the migration state machine 500 may change to the Hold Down state 506.

6—The Local Select state 502 may mark the responding process as the selected process. The migration state machine 500 may then change to the Select Remote state 503.

In some cases, the entry upon the Select Local state 502 (e.g., via CLI direction) may include a target process. This may override the peer selection process in step (1) above. However, if the target process refuses migration, the rest of the process may be examined for migration in the normal manner.

The Select Remote state 503 may be configured to choose a remote peer that runs the process selected by the Select Local state 502. The Select Remote state 503 may examine a plurality of peers and consider a number of factors including, availability in last announcement, CPU capacity, memory capacity, if it is known that the peer has the service selected running, and/or that the peer knows how to run the selected service.

The Select Remote state 503 may use the following logic steps to select the remote peer:

1—Each peer that is marked as not examined and/or that has the selected process may be examined. The process with the most available resources and that has the selected process may be considered first. The process may be considered with respect to the number of CPU's and the CPUs' capacity, e.g., the CPU's processing speed in mega hertz. For instance, multi-core processors or CPUs may have more capacity than single-core processors or CPUs. The processor with the most capacity may be selected and marked as being considered. An IRCP migration request message may then be sent to the selected peer processor and a timer may be started.

2—One of two events may then trigger the migration state machine 500. The peer may reply to the request with an IRCP migration response message or a timeout may occur. If a timeout occurs or the peer replies that it may not accept the migration request, then step (1) may be implemented again to ask the peers to start the process or service, including the previously selected peer, e.g., one by one until all peers are considered. If the peer replies that it does not run the process, then step one may be implemented again without considering the previously selected peer as a possible candidate to request starting the service. The previously selected peer may be excluded from consideration by leaving a flag unset. Alternatively, if the peer replies by accepting the migration request, then the migration state machine 500 may change to the Migration state 505.

3—If there is no peer available that runs the requested service, then the migration state machine 500 may change to the Start Remote (or Start Service) state 504.

When an available peer receives an IRCP migration request, the peer may check its capacity to validate that it is still available. The peer may also send a local request to the target process/service to ask if the process can accept load. This message may not be an IRCP message but instead a locally defined system message. The local request message and similarly a local response message from the target process may indicate internal process statistics, e.g., to inform an IRCP agent of how well the application is processing messages. The IRCP agent may respond to the request from the source or requesting processor with either a confirmation (YES) or a rejection (NO) based on the response from the process. If the service/process does not respond in time, a timer running in the migration state machine 500 may force the consideration of a different process. If the service is not running yet on the peer processor, then an appropriate rejection may be sent to the source processor via IRCP to indicate that the process is not running.

Upon entering the Start Remote state 504, the following steps may be implemented:

1—A highest capacity processor that does not have the process/service running and knows how to run the process may be chosen. The process may be known and included in the peer's service list.
2—If no peer is left that may be capable of starting the service, then the migration state machine 500 may change back to the Select Remote state 503, where all the peers may be examined unsuccessfully causing, in turn, the migration state machine 500 to return to the Select Local state 502.
3—If a peer is found, then a service start message may be sent to the peer and a timer may be started. A flag that indicates the start of the requested process may also be set, which may prevent resending a request to start that process. If the timer expires or the peer replies with a rejection (NO), then the Start Remote state 504 may return to step (1). If the peer responds with an indication that the process was started, the migration state machine 500 may change back to the Select Remote state 503, where the newly started process may be the one next selected to which to migrate the load.

When entering the Migration state 505, both a target peer and a target process may have been selected. The target peer may inform the IRCP agent of the address and port number of the target process. This information may be sent in an internal (non-IRCP) message to the local source process to request the process to begin the migration of a percentage of its load. A timer may also be started to guard against the process taking too long to migrate or failing. The process, at migration completion, may respond with a local system migration complete message. Otherwise, the timer may expire before the completion of the migration. Both events may cause the migration state machine 500 to move to the Hold Down state 506.

The Hold Down state 506 may be a transition state. Upon entering this state, a timer may be started. All other inputs may be ignored until the timer expires. When the timer expires, the migration state machine 500 may transition to the Idle state 501. The migration state machine 500 may use a plurality of timers in the different states, as described above. For instance, any time a local message is sent to a process, the process may be assigned a determined number of seconds to respond before expiration. The number of seconds may be defined in a parameter IRCP.MIRG-RESP-TO. When a processor communicates using IRCP with one or more peers, a timer may be set to a number of seconds, which may be defined in another parameter IRCP.MIGR-PEER-RESP-TO. During migration, a larger timer may be used to allow two processes to move their state data. The timer may be set to a number of seconds defined in a parameter IRCP-MIGRATION-TO. The Hold Down state 506 may have a timeout value that is defined in a parameter IRCP.HOLDDOWN-TO. The values of the parameters above may be configurable by an IRCP agent.

Sometimes, a dynamic or automatic migration scheme, such as described above, may result in bouncing load. Bouncing load may occur when one processor is overloaded and thus migrates load to another peer which may not be overloaded. Once the load settles on the new processor or CE, the processor may discover that it has become overloaded, while the freed processor may not be overloaded any more and may be available to take on the load again, which may trigger another process migration. Thus, a sequence of migrations for the same process may occur, e.g., the process may bounce back and forth between the processors. This scenario may occur in a more complicated manner, where the load may move to more than two processors or CEs, e.g., in a circular pattern. To avoid bouncing load, a plurality of measures may be built into IRCP and may be considered by both application developers and administrators. The following is a list of considerations that may be taken to avoid bouncing load.

In a first consideration, an automated system (for dynamic migration) may not ask a process to migrate about 100 percent of its work load. Doing so may invite bouncing load. Instead, an automated portion of IRCP may ask a process to move a relatively small percentage of its load, e.g. from about 10 percent to about 20 percent. This gives the system a chance to slowly move its load around when possible. In some cases, a complete load migration may be requested by a user command. As such, the user may ensure that both the source and target processors are idle and use this migration request as part of a planned upgrade or other maintenance activity.

When considering a percentage of load to move to a peer, the sending agent may need to carefully examine the amount of CPU capacity that the percentage of load translates to on the target processor. The advertised capacity and processing capabilities may be carefully factored in to see if a CE can receive a migrated load. A CE that advertises its capability to take on load may not be actually able to successfully accommodate about 10 percent of the process load after migration. A sender may choose a CE to migrate load to if the CPU calculations confirm whether the CE has the actual capacity to handle the transferred load.

When a process receives a request to migrate load out, the process may refuse the migration request if it is asked to migrate a load percentage but is unable to. This may be an important design aspect of applications that support migration. Such applications may have knowledge of how and what the applications may migrate. If all current load of an application is hosted in a single entity that can only be migrated entirely, then migrating the application's load may lead to bouncing load. In this case, it may be preferable for the application to refuse to migrate its load, which may instead cause some other less busy process to migrate some of its load, and hence free more resources for the application. For example, a BGP process may control load between peers by migrating load to another BGP process on a peer processor. If all the load being generated is from a single BGP process, then moving that load may idle the overloaded BGP process but cause the target process to become busy and/or the peer process to become overloaded.

In an embodiment, process migration may be decided based on a low water mark (e.g., a threshold value) for idle CPU time and a high water mark value for idle CPU usage. A target process may receive a migration request if its CPU idle time is equal to or below the low water mark. Additionally, a processor may be considered overloaded if its idle CPU usage is equal to or below a high water mark. The low water mark may be defined in a IRCP system parameter IRCP.CPU-LOW-WATER and the high water mark may be defined in an Internal Router Capability (IRC) parameter IRCP-.CPU-HIGH-WATER. The range or difference between the low and high water marks may be substantial. As such, a CE may take on load when it is substantially idle and may only migrate load when it is substantially busy. The high water mark may be set carefully within a range where some CPU headroom may still be available, e.g., to account for the possibility that the migration procedure may temporarily add to the CPU usage. In one recommended setting the low water mark, IRCP.CPU-LOW-WATER may be equal to about 70 percent and IRCP.CPU-HIGH-WATER may be equal to about 30 percent. These values may be used as starting points and may be tuned or modified based on system conditions.

Figure 6:
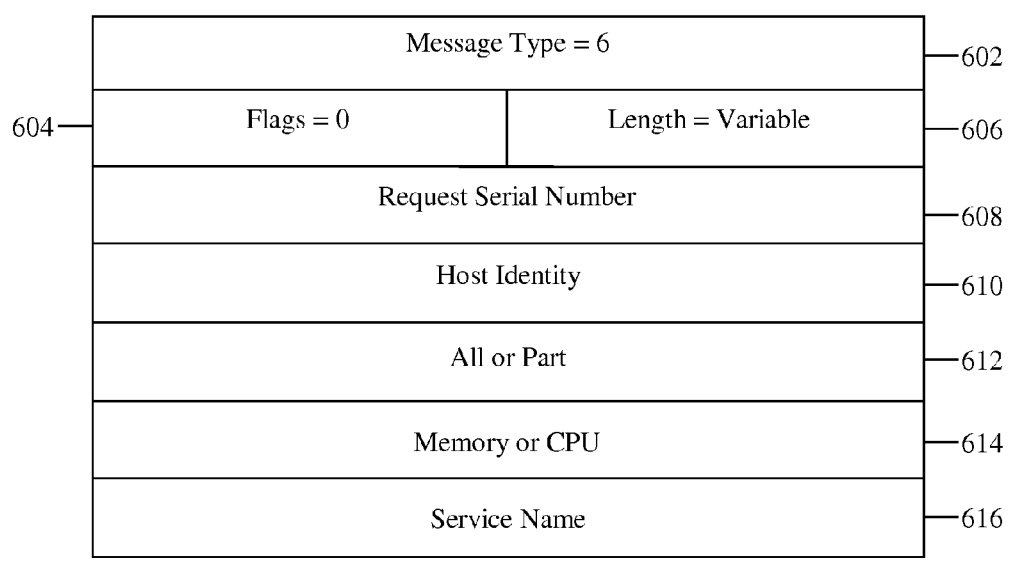
FIG. 6 is a schematic diagram of an embodiment of a process migration request.

FIG. 6 illustrates an embodiment of a process migration request 600, which may be an IRCP migration request message. The process migration request 600 may be sent to a remote process on a target processor to request transferring load from a local process on a source processor. The process migration request 600 may comprise a message type field 602, a plurality of flags field 604, a length field 606, a request serial number field 608, a host identity field 610, an all or part field 612, a memory or CPU field 614, and a service name field 616.

The message type field 602 may comprise about 32 bits and have a value of about six that indicates the type of the process migration request 600. The flags field 604 may comprise about 16 bits, set to a value of about zero by the sender, and ignored by the receiver. The length field 606 may comprise about 16 bits and indicate the length of the process migration request 600, e.g., in bytes. The request serial number 608 may comprise about 32 bits and indicate the request serial number of the process migration request 600, which may be created by the sender and included in the receiver's response. The host identity field 610 may comprise about 64 bits and represent the identity of the sending host or peer. The host identity field 610 may have a value that is generated by selecting the lowest machine address of a plurality of sender's Ethernet interfaces.

The all or part field 612 may comprise about 32 bits and may be set, e.g., to about one, to indicate that all load is to be transferred or may be reset, e.g., to about zero, to indicate that part of the load is to be transferred. The memory and CPU field 614 may comprise about 32 bits and may be set, e.g., to about one, to indicate that the sender is constrained by memory or may be reset, e.g., to about zero, to indicate that the sender is constrained by CPU. The service name field 616 may indicate the requested service or process that the sender needs to migrate load to. The service name may be represented by an ASCII string that comprises the service name followed by a NULL (or zero) character.

Figure 7:
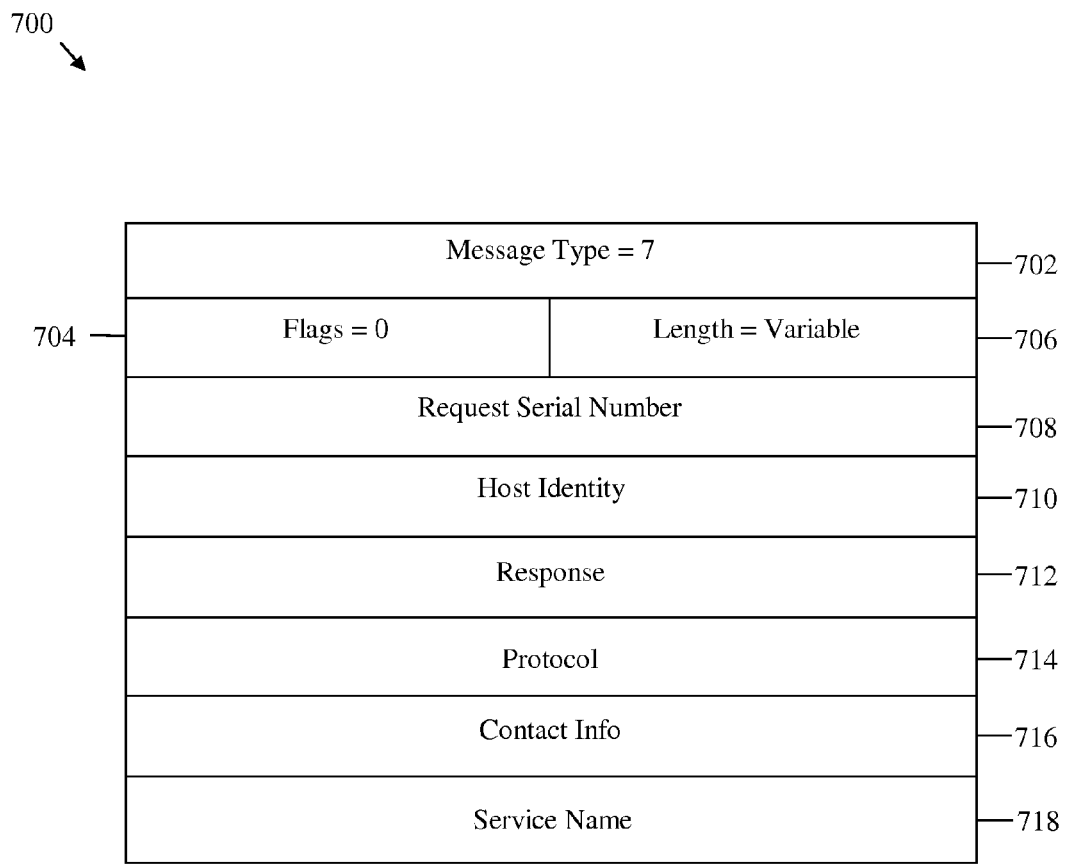
FIG. 7 is a schematic diagram of an embodiment of a process migration response.

FIG. 7 illustrates an embodiment of a process migration response 700, which may be an IRCP migration response message. The process migration response 700 may be sent by the remote process in response to receiving an IRCP migration request message, such as the process migration request 600. The process migration response 700 may comprise a message type field 702, a plurality of flags field 704, a length field 706, a request serial number field 708, a host identity field 710, a response field 712, a protocol field 714, a contact information field 716, and a service name field 718.

The message type field 702, the flags field 704, the length field 706, the request serial number field 708, the host identity field 710, and the service name field 718 may be configured similar to the corresponding fields in the process migration request 600. Specifically, the request serial number field 708 and the service name field 718 may match the request serial number field 608 and the service name field 616, respectively. The response field 712 may comprise about 32 bits and may indicate one of three responses: IRCP-SVC-NOT-RUNNING(10), which indicates that the service or process is not running, IRCP-MIGRATION-OK(10), which indicates it is allowed (OK) to proceed with migration, and IRCP-MIGRATION-DENIED(10), which indicates that is not allowed to proceed with migration. The protocol field 714 may comprise about 32 bits and may comprise a protocol identification of the transport specified in the socket. A value of about 132 may be used to indicate using a Stream Control Transmission Protocol (SCTP). The contact information field 716 may comprise about 128 bytes and may comprise a socket address storage type that holds the socket address of the lead process contacted that may be responsible for the service on the sender's platform.

Figure 8:
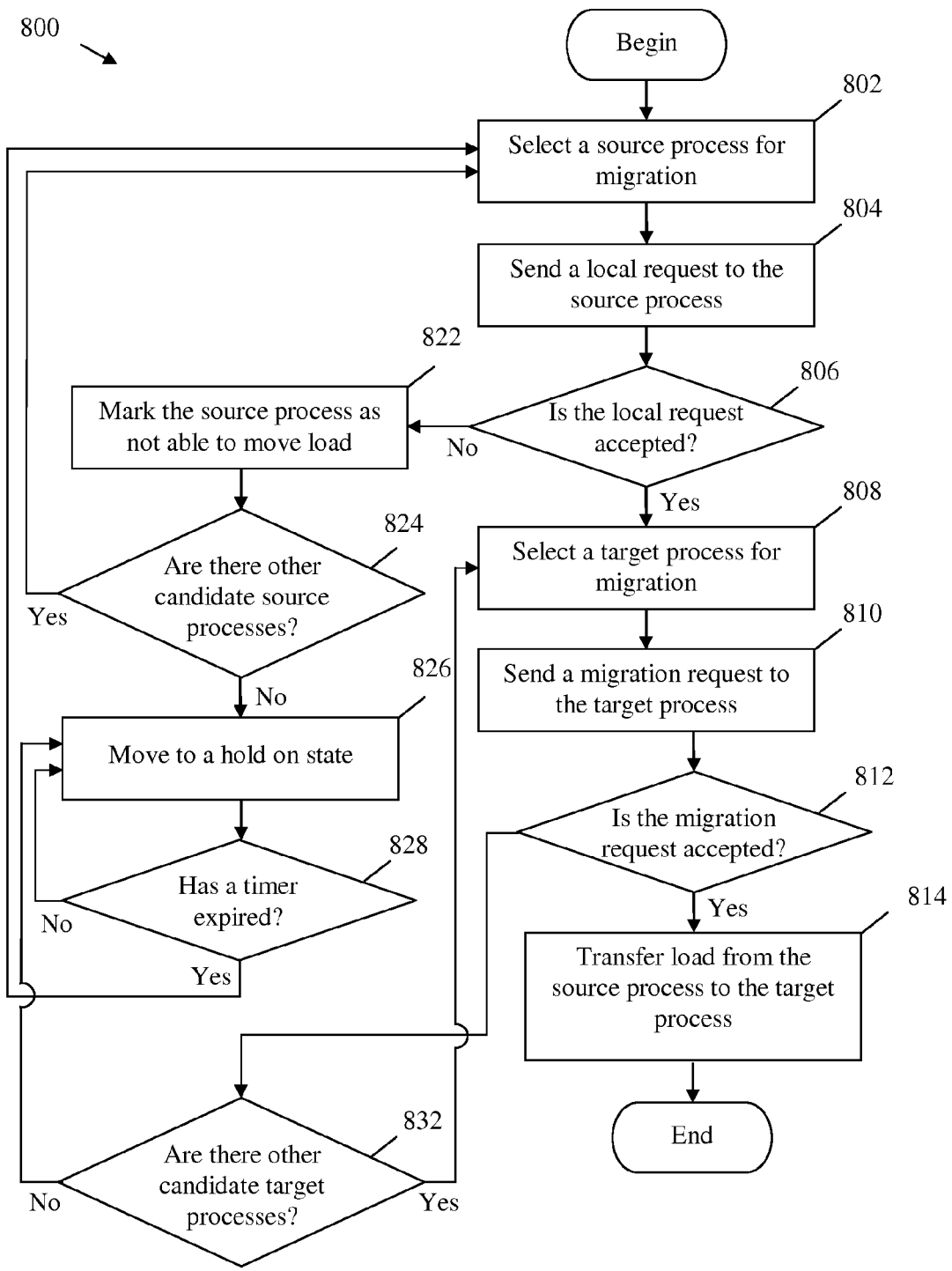
FIG. 8 is a flowchart of an embodiment of a dynamic process migration method.

FIG. 8 illustrates an embodiment of a dynamic process migration method 800, which may be implemented between a source processor and a target processor in a network component, such as a router or a switch. For instance, a source PM, a target PM, an IRCP agent, or combinations thereof may be configured to support and/or implement the dynamic process migration method 800. A PM may monitor resources and service loading on a corresponding CPU and memory. The PM may then decide to move some of the loads on its processor to a peer PM and processor that may not be overloaded. Alternatively, the method 800 may be initiated via external requests, such as a message from a CLI process. The PM and peer PM may implement the method 800, which may use the migration state machine 500.

The method 800 may begin at block 802, where a source process may be selected for migration. The source PM or processor may use a selection algorithm to select a suitable or candidate source process from which to migrate load. The selection algorithm may include observing which of the local processes that run on the processor has less available resources (e.g., CPU, memory, other network resources), and selecting a candidate source process that uses more resources and supports load migration. The algorithm may also take into account long term and/or short term history of the processes and their usages.

At block 804, a local request may be sent to the source process. The local request may be sent to query the local process as to whether the process is capable of moving load at the time of the request. For example, the source process may be in a middle of a critical operation during which load transfer may not be possible. At block 806, the method 800 may determine whether the local request is accepted. If the local request is accepted by the local source process, then the method 800 may proceed to block 808. Otherwise, the method 800 may proceed to block 822. At block 808, a target process may be selected for migration. The target PM or processor may use a selection algorithm to select a suitable or candidate target process to migrate load to. The target PM or processor may also take into account the statistics (including resource usage) on the source process/processor and the target process/processor. The statistics may include CPU capacity, memory capacity, and other information that may be generated dynamically about peer PMs/processors.

At block 810, a migration request may be sent to the target process. For example, the target PM may send an IRCP migration request message, such as the process migration request 600, to the target process. At block 812, the method 800 may determine whether the migration request is accepted. The target process may return an IRCP migration response message, such as the process migration response 700, to the target PM to accept or refuse the migration request. The target process may also return internal statistics, e.g., on the message processing by local processes on the target processor. The target process may accept or reject the migration request based on the internal statistics. If the migration request is accepted by the target process, then the method 800 may proceed to block 814. Otherwise, the method 800 may proceed to block 832.

At block 814, load may be transferred from the source process to the target process. If the migration request is accepted, the source PM may send a migration request to the source process to inform the source process of the target process on the target processor. The migration request may also indicate a percentage of load that may be transferred. For example, the percentage may be from about one percent to about 100 percent. One hundred percent may indicate a switchover (completer transfer), which may lead to the shut down of the source process after completing the migration process. The source process may also implement internal mechanisms to coordinate and migrate its process states, such as the process state synchronization 400. Upon completing the migration process, the source process may send a message to the source PM to indicate the completion of process migration. If the migration process is aborted or rejected at any point in the method 800, then the source process may indicate in the message failure to migrate the process. The method 800 may end after block 814.

At block 822, the source process may be marked as not able to move load. At block 824, the method 800 may determine whether there are other candidate source processes. If the condition at block 824 is true, then the method 800 may return to block 802 to select another suitable source process. Otherwise, the method 800 may proceed to block 826. At block 826, the method 800 may move to hold on state, such as the Hold Down state 506. At block 828, the method 800 may determine whether a timer (for the hold on state) has expired. If the timer has expired, then the method 800 may return to block 802. Otherwise, the method 800 may return to block 826, e.g., to the hold on state. At bock 832, the method 800 may determine whether there are other candidate target processes. If the condition at block 832 is true, then the method 800 may return to block 808 to select another suitable target process. Otherwise, the method 800 may return to block 826.

Figure 9:
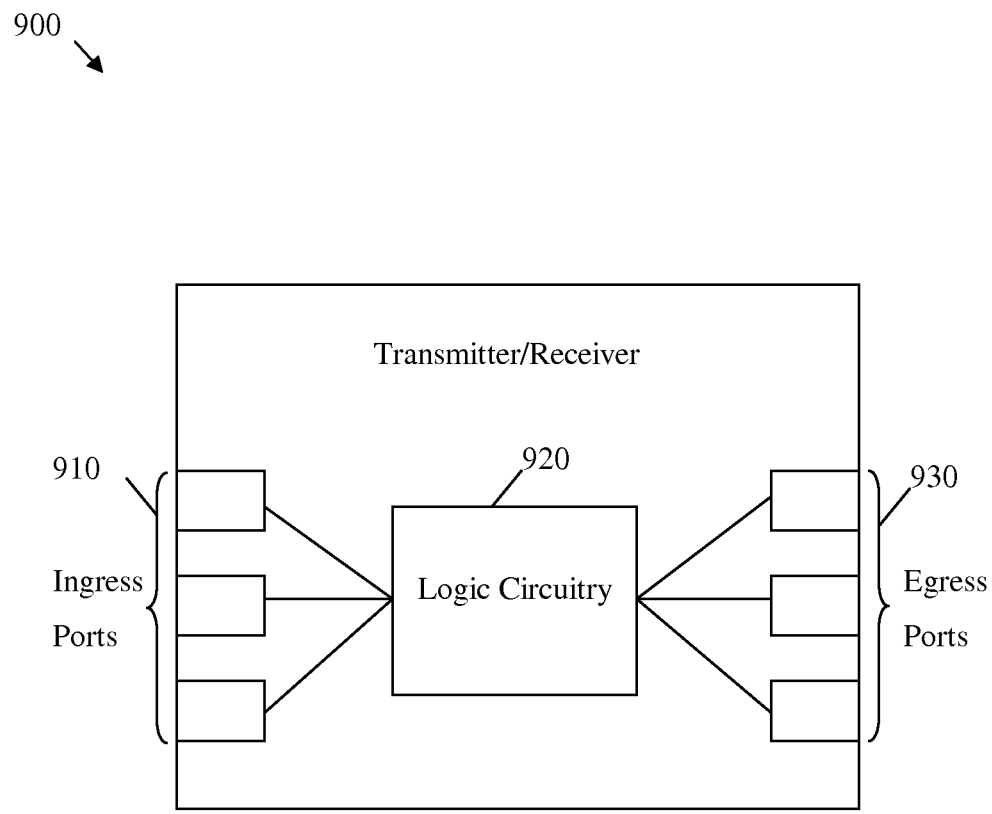
FIG. 9 is a schematic diagram of an embodiment of a transmitter/receiver unit.

FIG. 9 illustrates an embodiment of a transmitter/receiver unit 900, which may be any device that transports packets through a network. For instance, the transmitter/receiver unit 900 may be located in a network component, such as a router or a switch. The transmitted/receiver unit 900 may comprise one or more ingress ports or units 910 for receiving packets, objects, or Type-Length Values (TLVs) from other network components, logic circuitry 920 to determine which network components to send the packets to, and one or more egress ports or units 930 for transmitting frames to the other network components.

Figure 10:
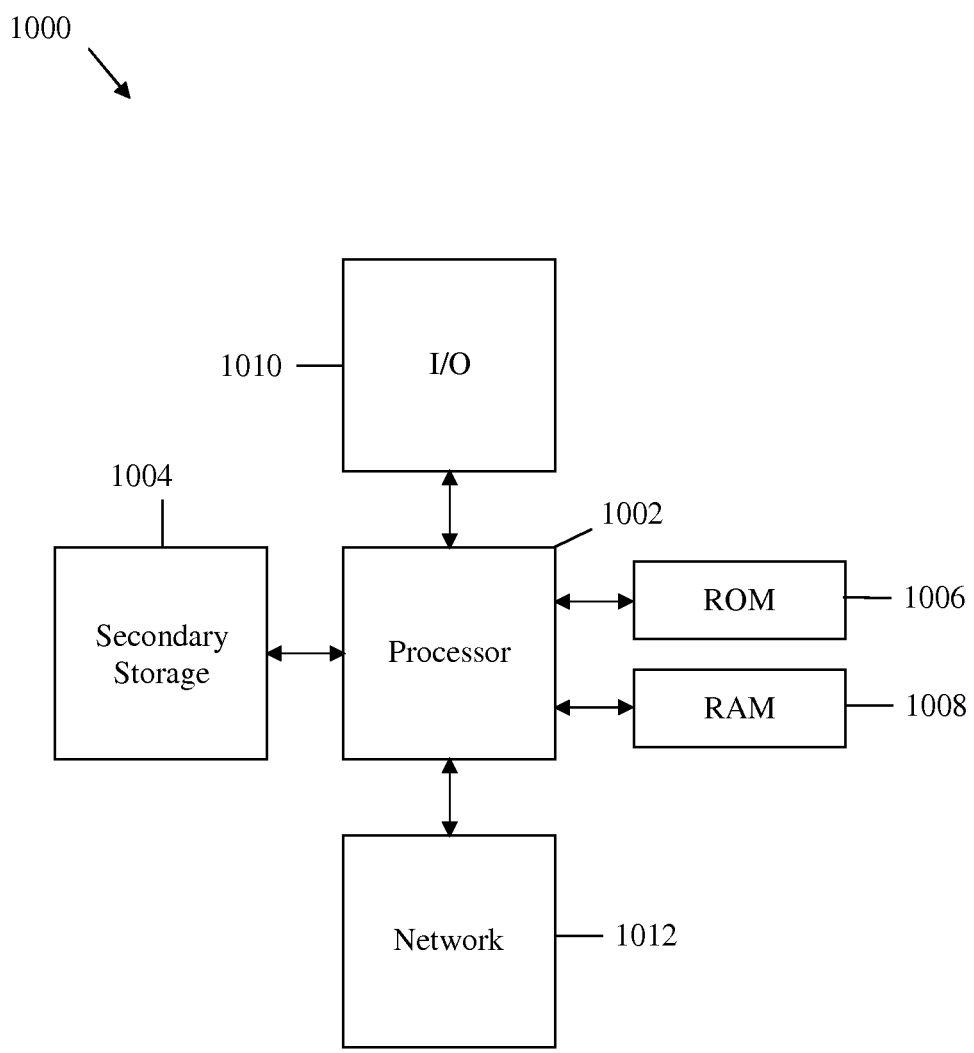
FIG. 10 is a schematic diagram of an embodiment of a general-purpose computer system.

The network components and/or methods described above may be implemented on any general-purpose network component, such as a computer or network component with sufficient processing power, memory resources, and network throughput capability to handle the necessary workload placed upon it. FIG. 10 illustrates a typical, general-purpose network component 1000 suitable for implementing one or more embodiments of the components disclosed herein. The network component 1000 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. The processor 1002 may be implemented as one or more CPU chips, or may be part of one or more application specific integrated circuits (ASICs).

The secondary storage 1004 is typically comprised of one or more disk drives or tape drives and is used for non-volatile storage of data and as an over-flow data storage device if RAM 1008 is not large enough to hold all working data. Secondary storage 1004 may be used to store programs that are loaded into RAM 1008 when such programs are selected for execution. The ROM 1006 is used to store instructions and perhaps data that are read during program execution. ROM 1006 is a non-volatile memory device that typically has a small memory capacity relative to the larger memory capacity of secondary storage 1004. The RAM 1008 is used to store volatile data and perhaps to store instructions. Access to both ROM 1006 and RAM 1008 is typically faster than to secondary storage 1004.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a peer processor;
a processor configured to migrate load from a first source process running on the processor to a first target process running on the peer processor in a dynamic manner by monitoring an amount of resources used by the first source process; and
an Internal Router Capability Protocol (IRCP) agent configured to:
select a second source process from a plurality of local processes for migrating the load, wherein the local processes exist within a control plane on the apparatus;
send a local request to the second source process, wherein the local request is sent within the control plane on the apparatus;
receive a local response from the second source process, wherein the local response is received within the control plane on the apparatus, and wherein the local response indicates the local request is not accepted by the second source process;
based on the indication that the local request is not accepted by the second source process, select the first source process for load migration;
send a migration request to a second target process;
receive a migration response from the second target process, wherein the migration response indicates the migration request is rejected by the second target process;
based on the indication that the local request is not accepted by the second source process, move to a hold down state to wait before selecting the first source process for load migration;
based on the indication that the local request is not accepted by the second source process, mark the second source process as unable to move load and excluding the second source process from a plurality of candidate source processes when selecting the first source process;
based on the indication that the migration request is rejected by the second target process, move to a hold down state to wait before selecting the first target process for load migration;
based on the indication that the migration request is rejected by the second target process, select the first target process for load migration; and
cause the processor to transfer the load from the first source process to the first target process.

2. The apparatus of claim 1, wherein the resources comprise at least one of memory usage by the first source process and central processing unit (CPU) usage by the first source process.

3. The apparatus of claim 1, wherein the processor and the peer processor are located on a single router or switch and configured to communicate with one another via IRCP, and wherein the IRCP is configured to allow the processor to detect a new peer processor, discover capabilities of the new peer processor, discover at least one running service on the new peer processor, and migrate load to the new peer processor.

4. The apparatus of claim 3, wherein the processor comprises a process manager (PM), and wherein the PM is configured to run on the processor, manage startup, monitor at least one other process on the processor, restart a failed process on the processor, and communicate using IRCP with a peer PM that runs on the peer processor.

5. The apparatus of claim 3, wherein the IRCP agent is further configured to:
monitor a plurality of processes on the processor;
determine that the amount of resources used by the first source process exceeds a threshold; and
based on the determination that the amount of resources used by the first source process exceeds the threshold, select the first source process from among the processes for load migration.

6. The apparatus of claim 1, wherein the first target process comprises at least one attribute of having less load than the first source process and using less resources than the first source process.

7. The apparatus of claim 1, wherein the load is migrated in response to a user command-line interface (CLI).

8. A computer program product for use by a network component, the computer program product comprising computer executable instructions stored on a non-transitory computer readable medium such that when executed by a plurality of processors cause the network component to:
select a first source process from a plurality of local processes for migrating a load, wherein the local processes exist within a control plane on the network component;
send a local request to the first source process, wherein the local request is sent within the control plane on the network component;
receive a local response from the first source process, wherein the local response is received within the control plane on the network component, and wherein the local response indicates the local request is not accepted by the first source process;
based on the indication that the local request is not accepted by the first source process, select a second source process for load migration;
send a migration request to a first target process;
receive a migration response from the first target process, wherein the migration response indicates the migration request is rejected by the first target process;
based on the indication that the local request is not accepted by the first source process, move to a hold down state to wait before selecting a second source process for load migration;
based on the indication that the local request is not accepted by the first source process, mark the first source process as unable to move load and excluding the first source process from a plurality of candidate source processes when selecting the second source process;
based on the indication that the migration request is rejected by the first target process, move to a hold down state to wait before selecting a second target process for load migration;
based on the indication that the migration request is rejected by the first target process, select the second target process for load migration; and
migrate the load from the second source process to the second target process.

9. The computer program product of claim 8, wherein the instructions cause a first of the processors to migrate the load without disrupting a service associated with the second source process and the second target process by employing process state synchronization between the second source process and the second target process.

10. The computer program product of claim 9, wherein the process state synchronization comprises:
   locking process state data related to the second source process;
   transferring a copy of the locked process state data to the second target process;
   receiving external requests for the second source process;
   forwarding and batching the external requests to the second target process;
   unlocking process state data after transfer; and
   processing the batched external requests at the second target process.

11. The computer program product of claim 8, wherein the instructions further cause a first of the processors to terminate the second source process after migrating all the load of the second source process to the second target process.

12. The computer program product of claim 8, wherein the instructions cause a second of the processors to:
   determine that the second target process is not running on the second processor;
   determine that the second processor is capable of running the second target process; and
   based on the determination that the second target process is not running on the second processor and that the second processor is capable of running the second target process, start the second target process at the second processor.

13. The computer program product of claim 8, wherein the load is migrated using an Interim Inter-Switch Signaling Protocol (ISSP).

14. The computer program product of claim 8, wherein the instructions cause a first of the processors to migrate the load by implementing a process migration state machine that comprises:
   an Idle state to initiate load migration;
   a Select Local state for selecting the second source process;
   a Select Remote state for selecting the second target process;
   a Start Service for starting the second target process;
   a Migrate state for migrating a process state associated with the second source process; and
   a Hold Down state for temporarily waiting for at least one of a suitable source process and a suitable target process.

15. A method comprising:
   selecting a first source process from a plurality of local processes for migrating a load, wherein the local processes exist within a control plane on a network component;
   sending a local request to the first source process, wherein the local request is sent within the control plane on the network component;
   receiving a local response from the first source process, wherein the local response is received within the control plane on the network component, and wherein the local response indicates the local request is not accepted by the first source process;
   based on the indication that the local request is not accepted by the first source process, selecting a second source process for load migration;
   sending a migration request to a first target process;
   receiving a migration response from the first target process, wherein the migration response indicates the migration request is rejected by the first target process;
   based on the indication that the local request is not accepted by the first source process, moving to a hold down state to wait before selecting a second source process for load migration;
   based on the indication that the local request is not accepted by the first source process, marking the first source process as unable to move load and excluding the first source process from a plurality of candidate source processes when selecting the second source process;
   based on the indication that the migration request is rejected by the first target process, moving to a hold down state to wait before selecting a second target process for load migration;
   based on the indication that the migration request is rejected by the first target process, selecting the second target process for load migration; and
   transferring the load from the second source process to the second target process.

16. The method of claim 15, wherein the migration request is sent in an Internal Router Capability Protocol (IRCP) migration request message that comprises a message type field, a plurality of flags field, a length field, a request serial number field, a host identity field, an all or part field, a memory or central processing unit (CPU) field, and a service name field.

17. The method of claim 15, wherein the migration response is sent in an Internal Router Capability Protocol (IRCP) migration response message that comprises a message type field, a plurality of flags field, a length field, a request serial number field, a host identity field, a response field, a protocol field, a contact information field, and a service name field.

18. The apparatus of claim 1, wherein the processor is associated with a dynamic migration restriction that requires the processor to migrate twenty percent or less of a total load of the second source process in a single migration.

* * * * *